J. J. & T. E. FEARON.
CIGAR BANDING MACHINE.
APPLICATION FILED JAN. 6, 1909.

958,244.

Patented May 17, 1910.
10 SHEETS—SHEET 3.

Witnesses
Hamilton D. Turner
Harry L. Smith

Inventors
James J. Fearon
and
Thomas E. Fearon
by their Attorneys Smith & Crozier

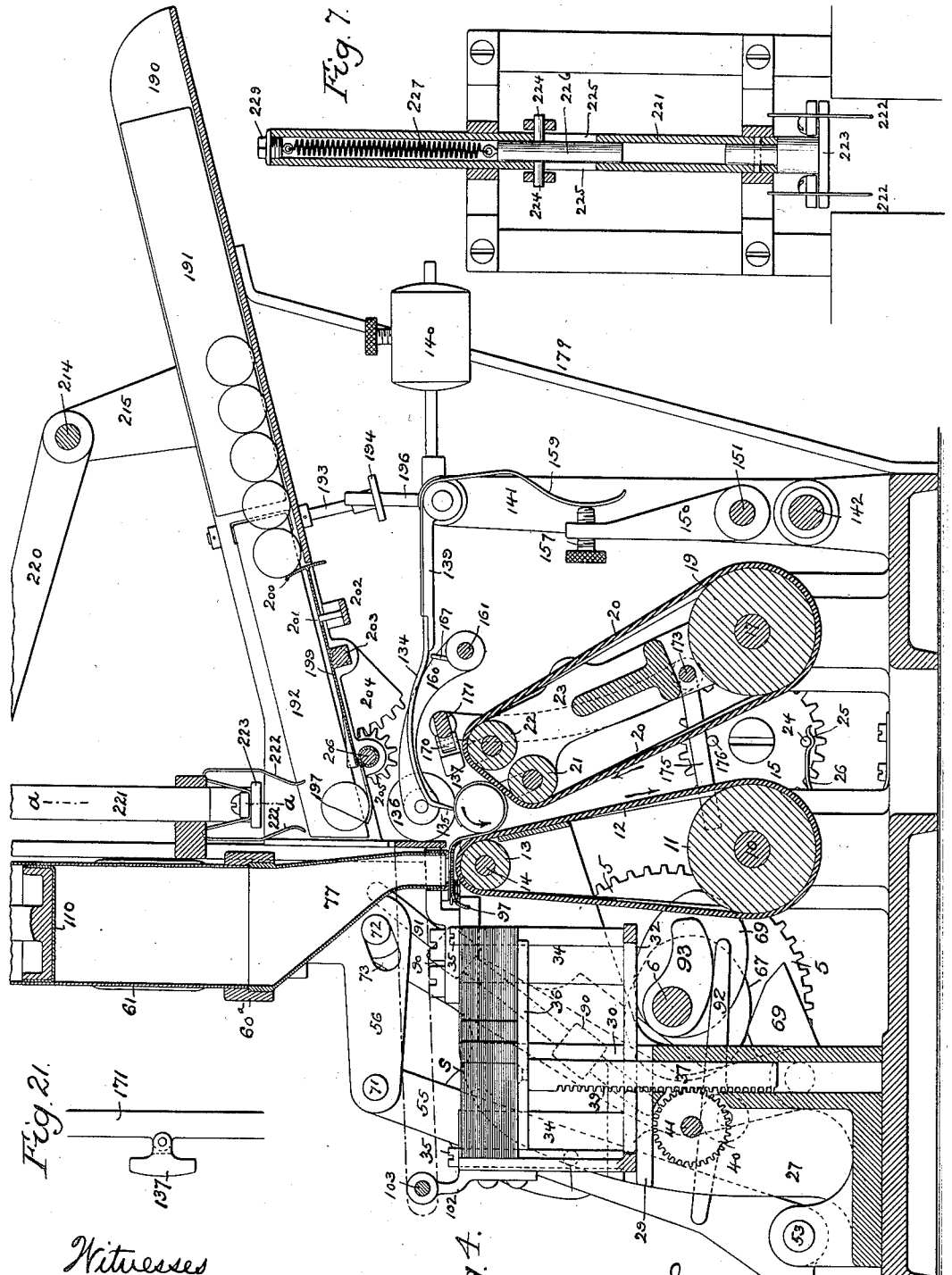

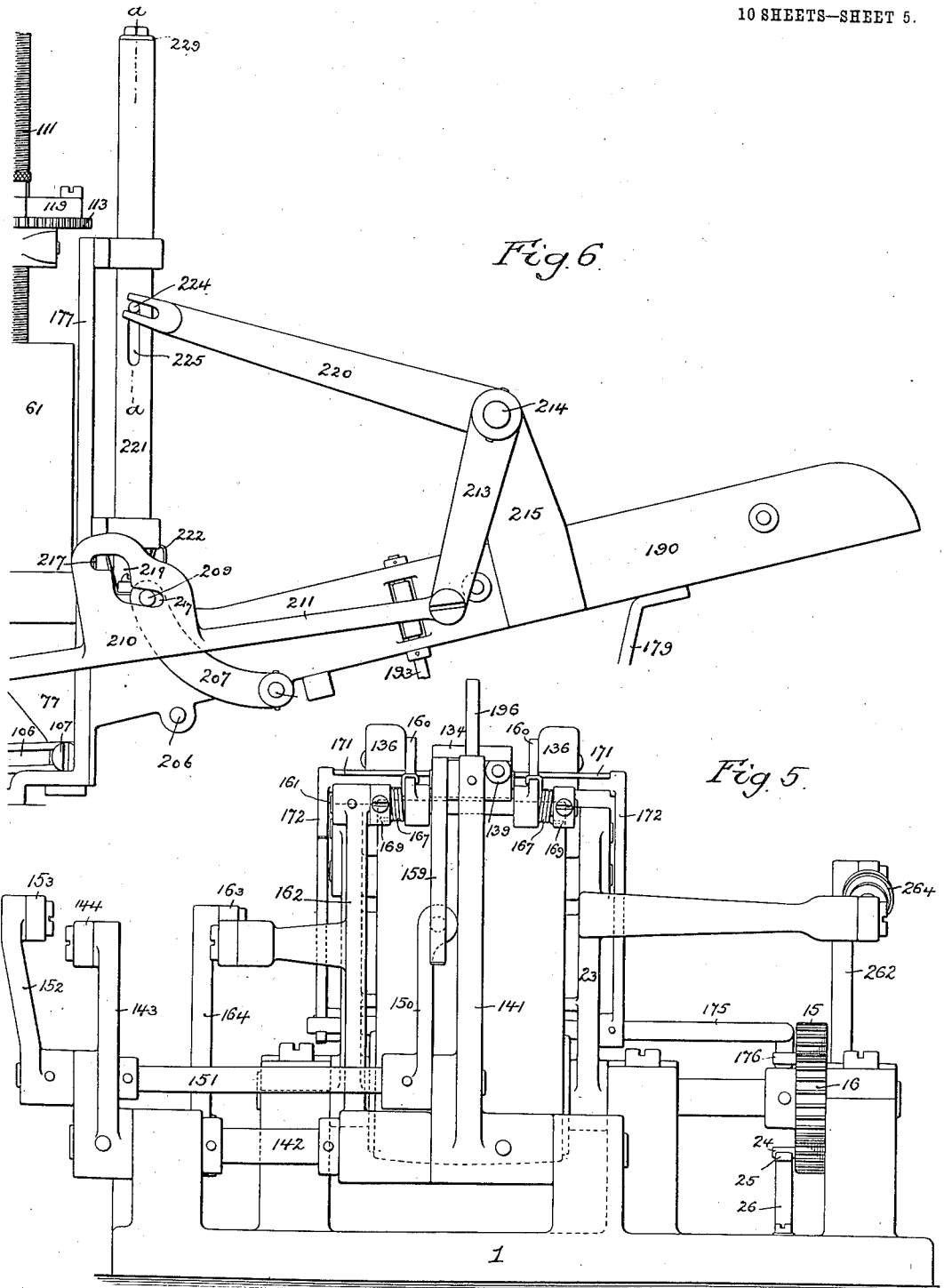

J. J. & T. E. FEARON.
CIGAR BANDING MACHINE.
APPLICATION FILED JAN. 6, 1909.
958,244.
Patented May 17, 1910.
10 SHEETS—SHEET 6.
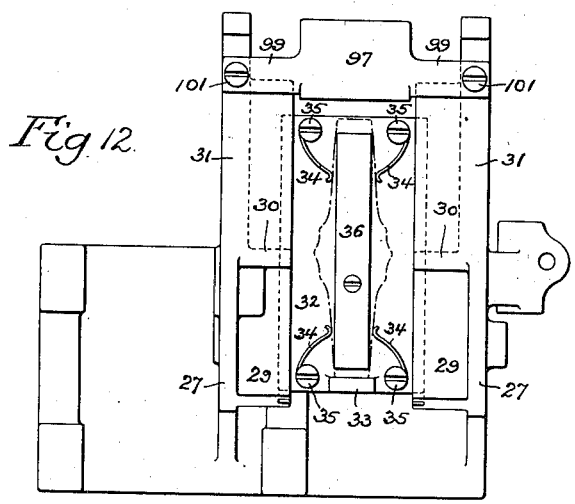
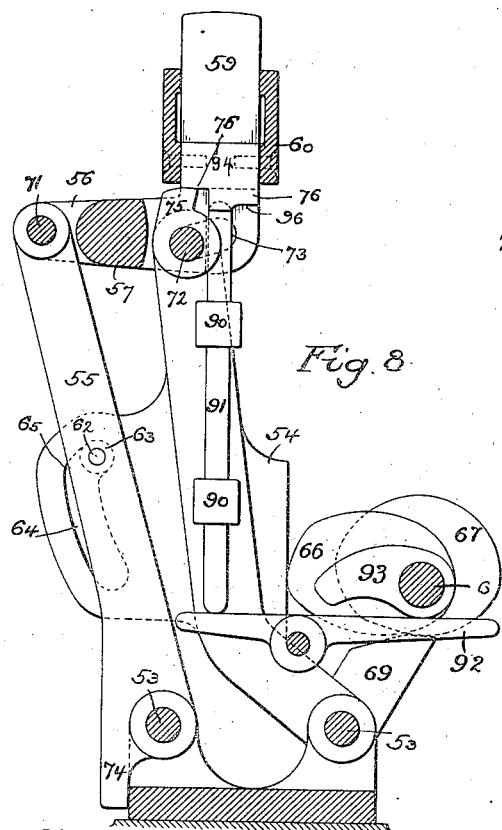
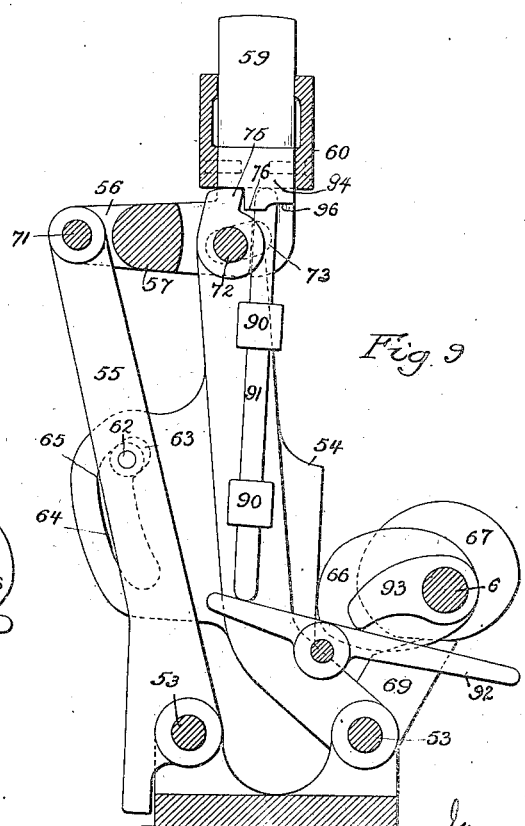

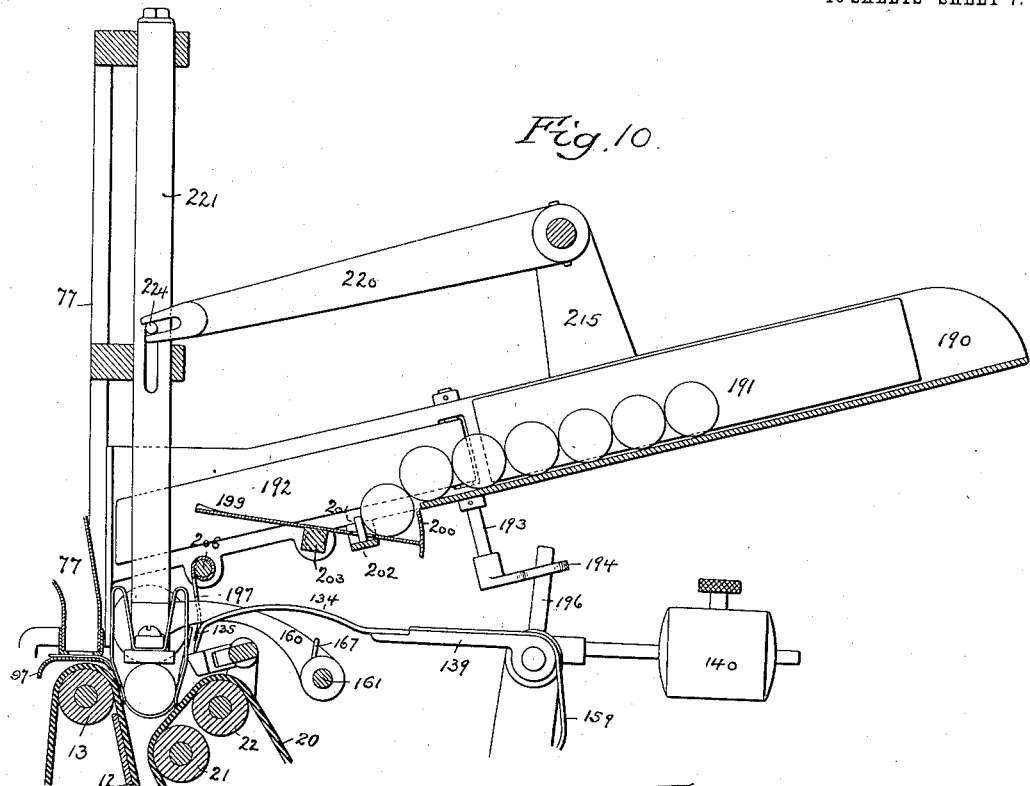

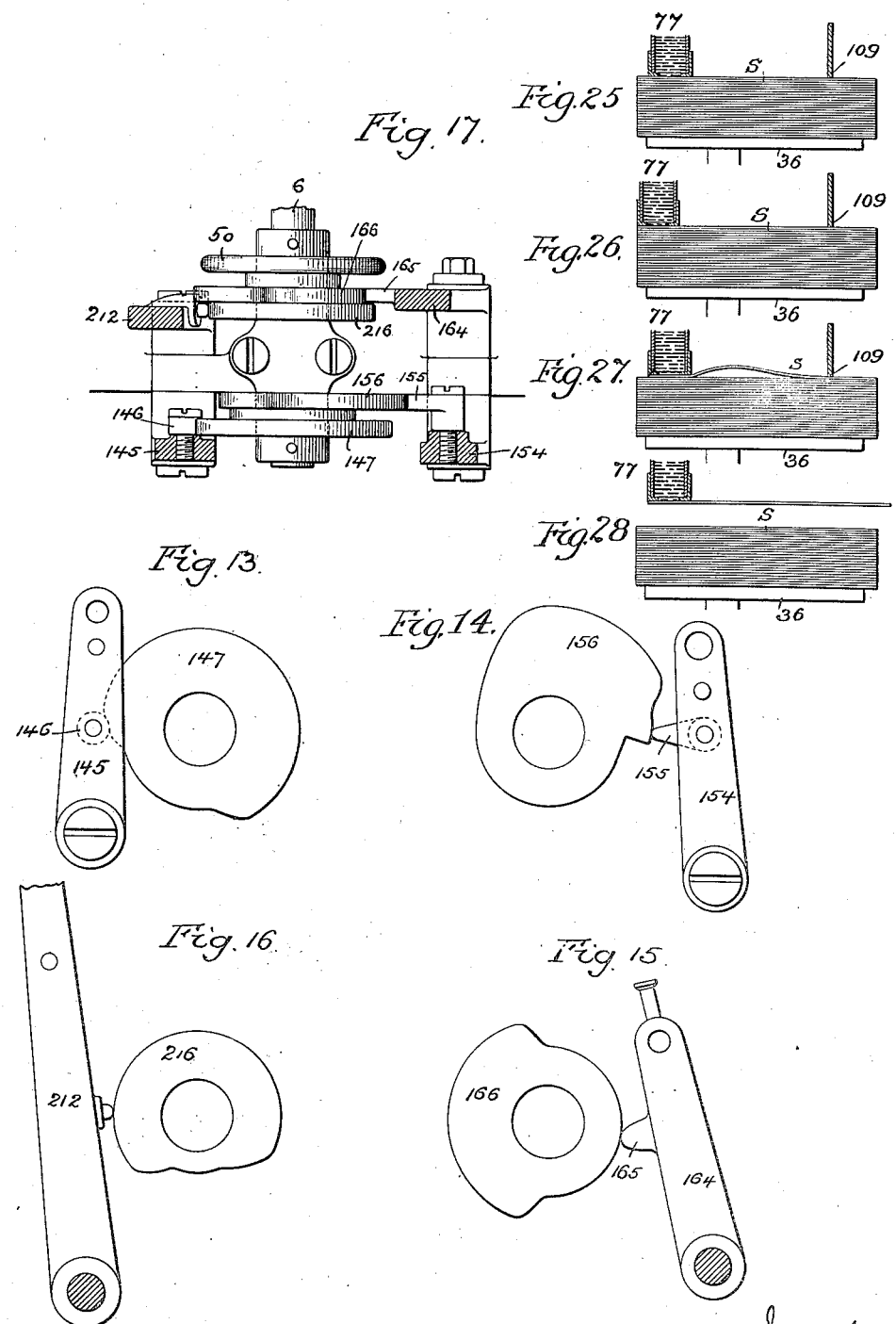

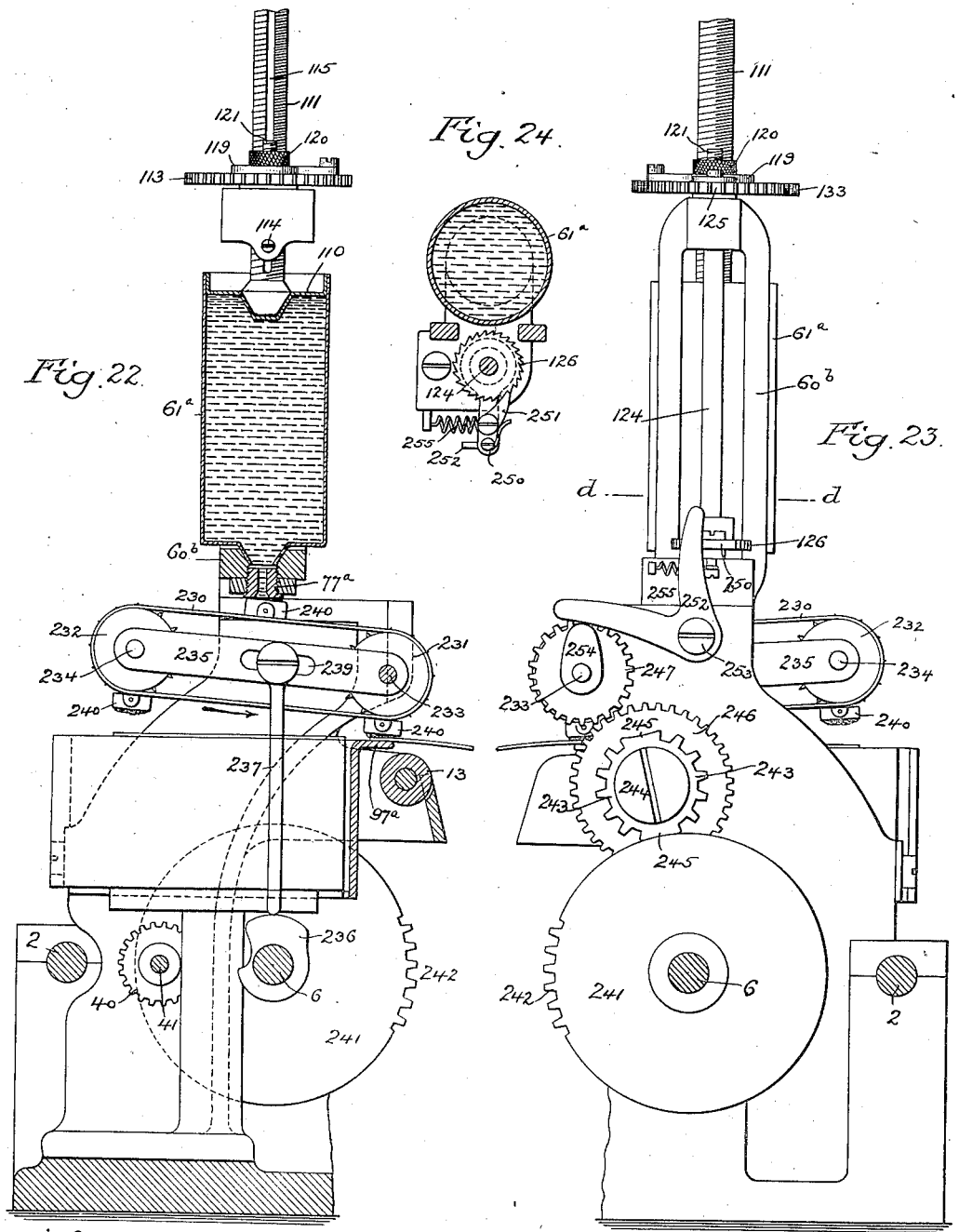

J. J. & T. E. FEARON.
CIGAR BANDING MACHINE.
APPLICATION FILED JAN. 6, 1909.

958,244.

Patented May 17, 1910.
10 SHEETS—SHEET 10.

UNITED STATES PATENT OFFICE.

JAMES J. FEARON AND THOMAS E. FEARON, OF PHILADELPHIA, PENNSYLVANIA, ASSIGNORS, BY MESNE ASSIGNMENTS, TO THE BANDING MACHINE COMPANY, OF WILMINGTON, DELAWARE, A CORPORATION OF DELAWARE.

CIGAR-BANDING MACHINE.

958,244.   Specification of Letters Patent.   Patented May 17, 1910.

Application filed January 6, 1909.   Serial No. 471,016.

*To all whom it may concern:*

Be it known that we, JAMES J. FEARON and THOMAS E. FEARON, citizens of the United States, residing in Philadelphia, Pennsylvania, have invented certain Improvements in Cigar-Banding Machines, of which the following is a specification.

The object of our invention is to provide a machine for feeding successive bands to successive cigars, wrapping each band around its respective cigar, securing together the lapping ends of said band, and delivering the banded cigars from the machine.

The various novel features of construction of the different elements of the machine and the various novel combinations of elements contained therein are fully set forth and claimed hereinafter, and the functions performed by such construction and combination of the different elements of the machine and the manner in which these functions are performed are also fully described.

Figure 1:
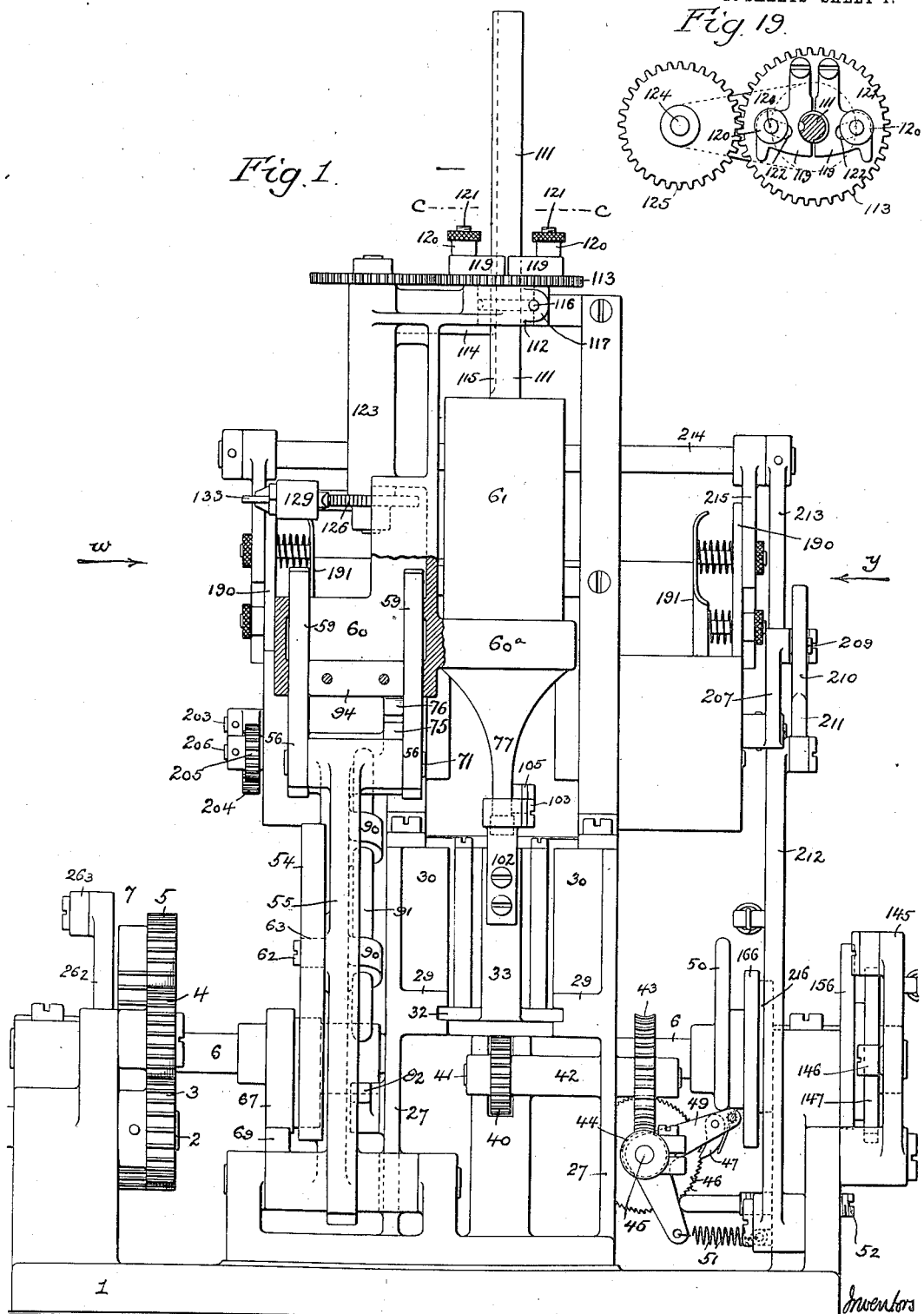
Figure 2:
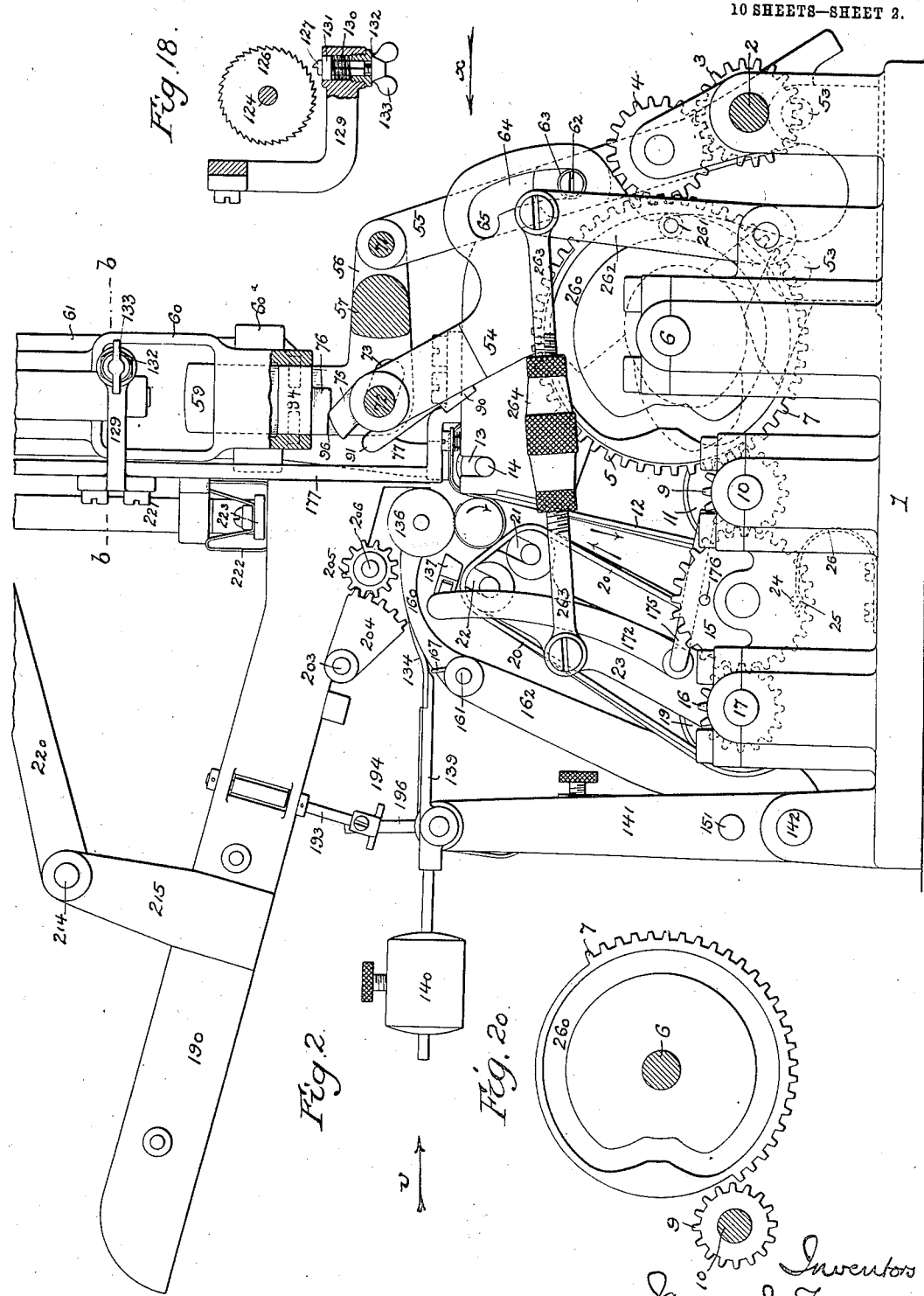
Figure 3:
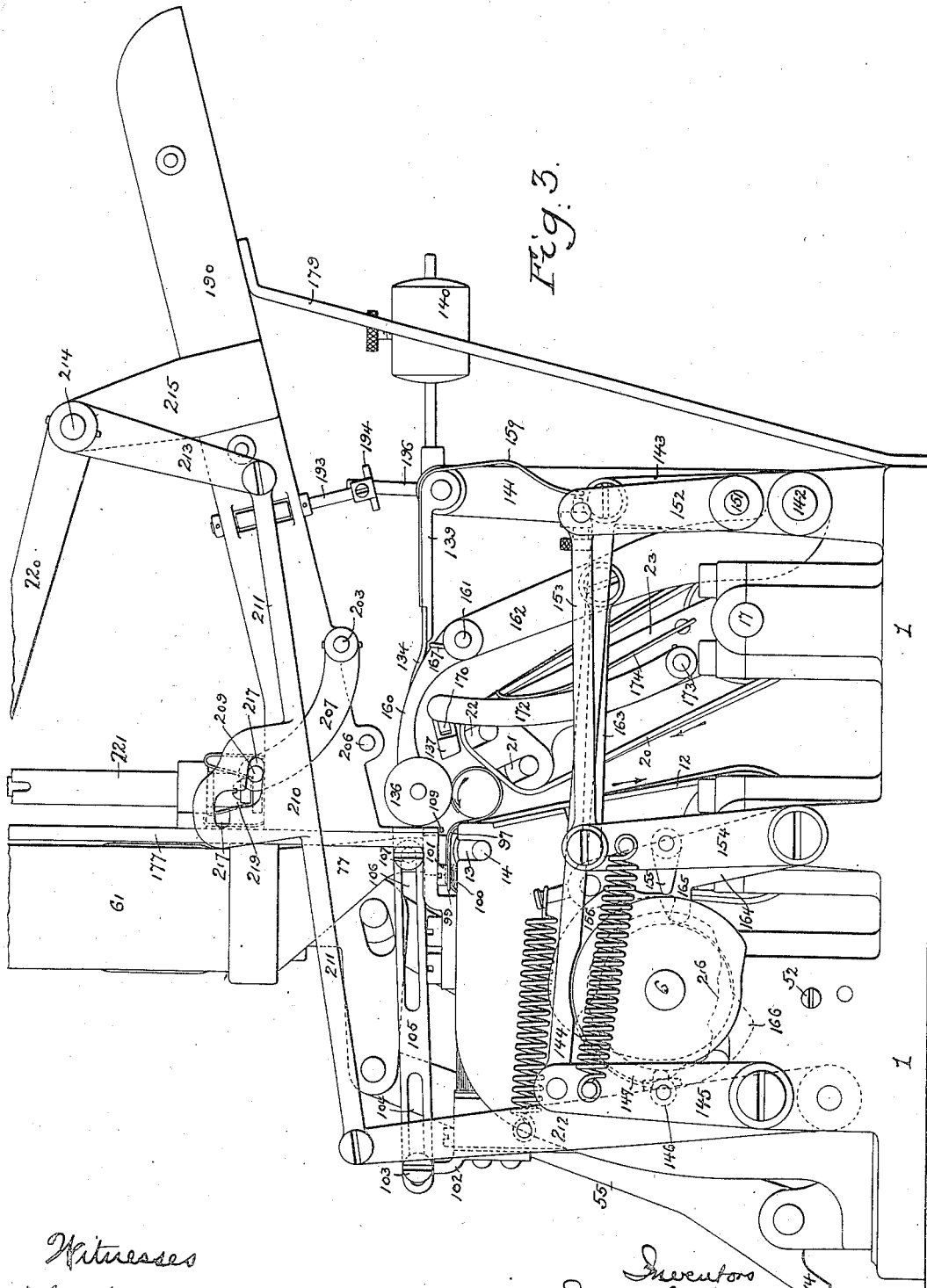
Figure 29:
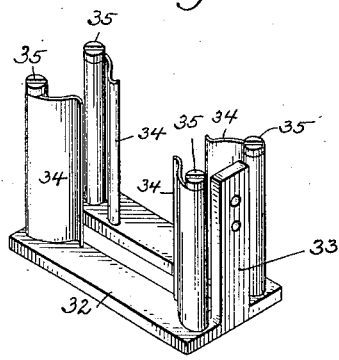
Figure 30:
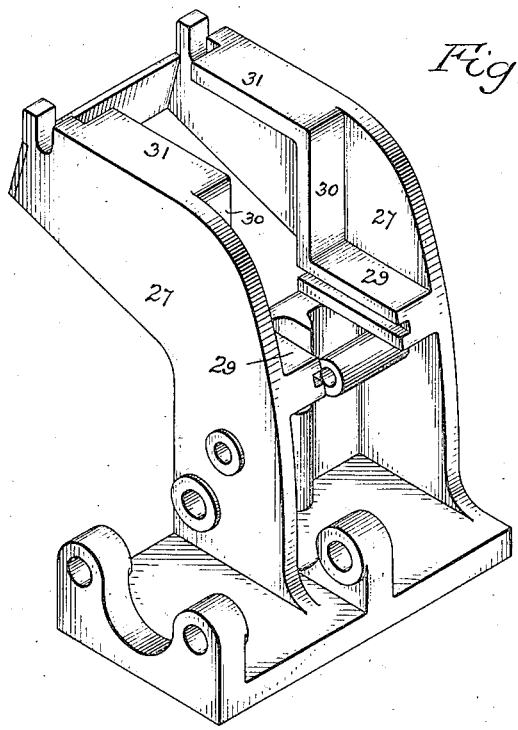

In the accompanying drawings—Figure 1 is a front view of a cigar banding machine constructed in accordance with our invention, the machine being viewed in the direction of the arrow $x$, Fig. 2; Fig. 2 is a view of the machine partly in longitudinal section and partly in side elevation looking in the direction of the arrow $w$, Fig. 1; Fig. 3 is a side elevation of the machine looking in the direction of the arrow $y$, Fig. 1; Fig. 4 is a view of the machine partly in side elevation and partly in central longitudinal section; (in Figs. 2, 3 and 4 certain of the upper parts of the machine are omitted). Fig. 5 is an end view looking in the direction of the arrow $v$, Fig. 2, but illustrating only the lower part of the machine, and, in order to prevent confusion, omitting a number of the parts in the distance; Fig. 6 is a side elevation of those portions of the mechanism which are omitted from Figs. 2, 3 and 4; Fig. 7 is a transverse section on the line $a$—$a$, Figs. 4 and 6; Fig. 8 is a view, partly in longitudinal section and partly in side elevation, showing, in a different position from that represented in the preceding figures, the devices which effect the movement of the paste pot carrier; Fig. 9 is a similar view illustrating the parts in still another position; Fig. 10 is a longitudinal sectional view illustrating, in a different position from that represented in Fig. 4, certain of the elements of the machine whereby the bands are applied to the cigars and the latter are fed to the band applying devices; Fig. 11 is a plan view of the trough or hopper for the cigars, illustrating also certain devices employed in connection with said trough or hopper; Fig. 12 is a plan view of the hopper or carrier for the bands and of the plate over which the bands are fed in succession to the cigars and band wrapping devices; Figs. 13, 14, 15 and 16 are side views of certain cams employed in the machine, and of parts of the levers acted upon by said cams; Fig. 17 is a plan or top view of the cam shaft and the cams and levers shown respectively in Figs. 13, 14, 15 and 16; Fig. 18 is a view, partly in plan or top view and partly in horizontal section, on the line $b$—$b$, Fig. 2; Fig. 19 is a horizontal section on the line $c$—$c$, Fig. 1; Fig. 20 is a side view of a combined gear wheel and cam constituting one of the elements of the machine; Fig. 21 is a plan or top view of a certain ironing or pressing device whereby the adhesion of the overlapping and pasted ends of the bands is insured; Fig. 22 is a view, partly in side elevation and partly in longitudinal section, illustrating a modified device for pasting and feeding the bands; Fig. 23 is a side elevation of the means employed for operating said modified pasting device; Fig. 24 is a horizontal section on the line $d$—$d$, Fig. 23; Figs. 25, 26, 27 and 28 are views illustrating certain operations of the pasting device. Fig. 29 is a perspective view of the label carrier, and Fig. 30 is a perspective view of that portion of the frame of the machine in which said label carrier is mounted.

In the drawings, 1 represents the fixed bed or base of the machine which carries the bearings and supports for the shafts and other operative members of the machine, and is intended to be secured to a work table or bench having below it any appropriate receptacle for the banded cigars, or means for directing the banded cigars to such a receptacle. The primary driving shaft of the machine is represented at 2, and this shaft is provided with a spur pinion 3, which, through an intermediate pinion 4, drives a spur wheel 5 on the main cam shaft 6 of the machine, said cam shaft also having a spur segment 7 which meshes with a pinion 9 on a shaft 10, the latter being provided with a drum 11 to which is adapted a belt or apron 12 running over a smaller drum 13 located above the drum 11 and mounted on a shaft 14 which is rotatable in bearings on a fixed portion of the machine.

The spur pinion 9 is connected, through the medium of an intermediate spur wheel 15, to a spur pinion 16, the latter being secured to a shaft 17, parallel with the shaft 10 and provided with a drum 19 to which is adapted a belt or apron 20, said apron passing over smaller drums 21 and 22 which are ratatably mounted in diagonal relation to one another upon shafts carried by a swinging frame 23, whereby the apron 20 can be caused to move from or toward the apron 12. The three drums 13, 21 and 22 are so disposed in respect to one another that the inner runs of the aprons 12 and 20 converge and thus form a tapering or hopper-like recess for the reception of the cigar to be banded, the inner run of the apron 12 traveling downwardly and the inner run of the apron 20 traveling upwardly, whereby contact of a cigar with the sides of the hopper-shaped recess in which it rests during the banding operation will tend to rotate said cigar in the direction of the arrow, Fig. 4.

In order to prevent any movement of the aprons 12 and 20 except when the toothed portion of the spur segment 7 is in mesh with the pinion 9, the spur wheel 15 is provided, on its inner side, with a projecting pin 24 for engagement with a pocket 25 in a spring 26, mounted upon a fixed member of the frame, the necessary movement of the aprons 12 and 20 necessitating, by preference, but a single turn of the spur wheel 15, so that when the toothed portion of the spur segment 7 passes out of mesh with the spur pinion 9 the pin 24 will always be resting in the pocket 25 of the spring 26, and further movement of the parts by momentum will thereby be prevented.

The bands which are to be applied to the cigars are represented at $s$ in Fig. 4, and these bands are contained in a hopper comprising opposite side frames 27 with inwardly projecting ribs 29, 30, and 31, the ribs 29 being grooved for the reception of the opposite edges of the bottom 32 of the hopper, which is provided at its rear end with a post 33 for contact with the rear ends of the bands, and, at each corner with an elastic wing plate 34 mounted upon and confined in position by a vertical pivot screw 35, whereby these wing plates can be readily adjusted so as to bear upon the opposite sides of the bands $s$ irrespective of any variation in the shape or dimensions of the various bands which have to be applied to the cigars. The bands rest upon the head 36 of a plunger 37 which passes through an opening in the bottom 32 of the hopper and has a toothed edge 39 which is in mesh with a spur wheel 40 on a shaft 41, the latter being free to turn in a bearing 42 projecting inwardly from one of the side frames 27 of the hopper. When the plunger 37 has been moved below the bottom plate 32 of the hopper, the latter can also be readily detached, by slipping said bottom plate 32 outwardly from its guides in the grooved rib 29, the parts being as readily restored to position.

The outwardly projecting portion of the shaft 41 has secured to it a worm wheel 43 which meshes with a worm 44 on a shaft 45 disposed at a right angle to said shaft 41 and provided with a ratchet wheel 46 with which engages a spring pressed pawl 47 pivotally mounted upon one arm of a lever 49, which is acted upon by a cam 50 on the cam shaft 6, as shown in Fig. 1, the other arm of said lever 49 being acted upon by a coiled spring 51 which tends to restore the lever, after each action of the cam 50, to a position of rest determined by contact of said lever with a stop pin 52, the latter being threaded for adaptation to a similarly threaded opening in the main frame of the machine, and being, therefore, adjustable so as to limit the back movement of the lever 49 and thus govern the effective throw of said lever under the action of the cam 50, whereby movement of the ratchet wheel 46 can be effected to the extent of one or more teeth, as desired, on each rotation of the cam shaft 6. By this means the plunger 37 can, on each rotation of said cam shaft 6, be raised to an extent commensurate with the thickness of one of the bands $s$, the permissible variation of movement providing for the use of bands of different thicknesses and insuring the presentation, always in the same horizontal plane, of the top band of the pile or stack of bands supported upon the plunger head 36, as shown in Fig. 4.

The mechanism which we prefer to employ for selecting the bands in succession from the top of the stack and carrying them forward in succession to the devices whereby they are wrapped around the cigar is as follows: Carried by rock shafts 53 which are mounted in suitable bearings on the base 1 are two levers 54 and 55, whose upper ends have pivotal connection with the horizontal arms 56 of a right angled frame composed of said arms 56, a connecting cross bar 57, and vertical arms 59, the latter serving as guides for a frame 60 which carries the paste reservoir 61 and the parts operating in conjunction therewith, said frame being free to move vertically upon the arms 59, in the manner hereinafter described. The levers 54 and 55 are also connected by means of a pin 62 projecting from the lever 55, and having an anti-friction roller 63 which travels in a segmental slot 64 in the lever 54, as shown in Fig. 2, this slot having an enlarged upper end 65, for a purpose described hereinafter. Backward movement of the lever 54 is effected by the direct action thereupon of a cam 66 on the shaft 6, and forward movement of the lever is effected by means of a cam 67 on said shaft, said cam acting upon an arm 69 on the rock shaft 53 of the lever, as shown by dotted lines in Fig. 2. The pivot pin 71, whereby the upper end of the lever 55 is connected to the arms 56, fits snugly to openings in said arms but the pivot pin 72 at the upper end of the lever 54 is adapted to inclined slots 73 in said arms 56, as shown in Figs. 2, 3 and 4, so that after the frame 60, which carries the paste reservoir, has been moved rearwardly to its full extent, determined by contact with the base 1 of a stop lug 74 on the lever 55, the lever 54 can have still further rearward movement, the pivot pin 72 traveling in the slot 73, and the antifriction roller 63 on the lever 55 then occupying the enlarged upper end 65 of the slot 64 in said lever 54, as shown in Fig. 8.

The pivot pin 72 carries a cam 75, which, during the joint travel of the levers 54 and 55 serves as a support for a lug 76 on the frame 60, as shown in Figs. 1 and 2, but just before the frame 60 has reached the limit of its rearward movement, the cam 75 is withdrawn from beneath the lug 76, and the frame 60, and with it the paste reservoir 61, drops so as to bring the open lower end of the nozzle 77 of said paste reservoir into contact with the upper face of the uppermost band of the stack at or near the rear end of the same, paste being thereby applied to the said upper face of the band and spread over the same during the short further rearward movement of the nozzle, the band being thereby caused to adhere to the nozzle during the subsequent movements of the paste reservoir. The first of these is a forward movement, so as to push the rear end of the uppermost band forwardly. At this time the forward end of the band is retained against movement by means of a device hereinafter described, consequently the effect of the first forward movement is to cause buckling of the top band, which insures its separation from the next band of the pile or stack, and prevents said next band from rising with the top band during the next or lifting movement of said top band. After the lifting movement, the paste reservoir moves forwardly in the arc of a circle corresponding to that followed by the pivot pins 71 and 72 on the forward swing of the levers 54 and 55, and the next movement is a slight drop at the termination of such forward movement, after which there is a dwell of the paste reservoir in the forward position, followed by a slight lift, then a rearward movement and then a drop as before described.

In order to effect the lift of the frame 60 and its paste reservoir we mount, in suitable guides 90 on the inner side of the lever 54, a rod 91, whose lower end, when said lever 54 is in its rearward position, comes under the influence of a lever 92 suitably mounted on the fixed frame of the machine and acted upon by a cam 93 on the cam shaft 6, as shown in Fig. 4, the upper end of the rod 91 being then in position to act upon a cross bar 94 (Figs. 1, 2, 8 and 9) of the frame 60 so as to lift the same, as shown in Fig. 9, and permit the forward portion of the cam 75 which has been pushing forwardly against the rear face of the lugs 76, to pass beneath said lug in order to support the paste reservoir in the lifted position. During the travel of the pivot pin 72 of the lever 54, in the slot 73 of the frame 6, the roller 63 has been traveling in the enlarged upper end of the slot 64, but it now contacts with the rear face of said slot and both of the levers 54 and 55 move forwardly together, carrying the frame 60 and paste reservoir with them.

The lug 76 has a forward recess 96, and when the levers 54 and 55 reach the limit of their forward movement, the cam 75 enters said recess 96 and permits a slight drop of the reservoir and its adhering band. The purpose of this slight drop of the paste reservoir at the termination of its forward movement is to insure the retention of the rear end of the band between the lower end of the nozzle 77 and a plate 97, which has laterally projecting wings 99 supported at their ends upon springs 100 let into openings in the side frames 27 of the band-carrying hopper, the rise of the plate under the influence of these springs being restricted by set screws 101, and this confining action taking place only when the band has been fully projected by the action of the paste-applying nozzle, so that there is no retarding action of the plate 97 upon the band during its forward travel and hence no tendency of the pasting nozzle to slide forwardly over the band when it is approaching the limit of its forward travel, and thus limit the extent of projection of the band, and the amount of overlap of the ends of the same when the band has been wrapped around the cigar.

The use of the spring-pressed plate 97, insures the proper holding of the rear end of the band between said plate and the mouth of the nozzle 77 irrespective of the thickness of the band, but does not interfere with the withdrawal of said rear end of the band from this hold by the subsequent action of the band-wrapping devices, and the consequent spreading of the paste to the extreme rear end of the band.

Mounted upon the post 33 at the back of the band-receiving hopper is a bracket 102 carrying a pin 103 which is adapted to a slot 104 in a bar 105 located at one side of the nozzle 77 of the paste reservoir, and having another slot 106 which receives a pin 107 projecting from said nozzle, the bar 105 having at its forward end a downwardly projecting finger 109. The purpose of this device is to hold down and prevent forward movement of the forward ends of the bands when the pasting nozzle is pressed down upon the rear ends of the same, and is traveling forward while in this position, otherwise there might be a tendency of the forward ends of the bands to spring up at such time and a possibility of carrying forward more than the uppermost band only when the latter was moved forwardly with the pasting nozzle. By reason of the device described, however, the finger 109 is pressed down firmly upon the forward end of the uppermost band when the pasting nozzle comes into contact with the rear end of the same, and is lifted from said forward end of the band as soon as the pasting nozzle is lifted from its rear end, so that it then offers no obstruction to the free forward movement of the top band.

The paste reservoir 61 consists of a vessel of cylindrical or other suitable shape, whose lower end is snugly fitted to a yoke 60ª on the frame 60, which yoke also carries the upper end of the tapering nozzle 77, and to the paste reservoir is snugly fitted a plunger 110, which has a screw threaded stem 111 passing freely through the hub 112 of a spur wheel 113, but prevented from turning with said hub by means of a tongue 114 on the frame 60 adapted to a vertical groove 115 in the threaded stem, as shown in Fig. 1. The hub 112 has an annular groove for the reception of a pin 116 carried by a bearing 117 on the frame 60, whereby said hub is vertically confined to said bearing but is free to turn therein (see Fig. 1).

Upon the spur wheel 113 are pivotally mounted two members 119 of a split nut which engage the threaded stem 111 and are held in engagement therewith by means of nuts 120 adapted to screw pins 121 projecting upwardly from the spur wheel 113 through segmental slots 122 in the members of the nut, as shown in Fig. 19, whereby, when the spur wheel 113 is rotated in the proper direction, the screw stem 111 will be forced slowly downward and the plunger 110 will exert pressure upon the paste in the reservoir 61 and cause the same to be ejected from the mouth of the nozzle 77.

When the members of the split nut are separated, the screw stem 111 and its plunger 110 can be readily lifted from the paste reservoir and an empty reservoir can then be readily removed from its supporting yoke 60ª and replaced by a full one. This downward movement of the paste-ejecting plunger 110 should take place intermittently, it being necessary to eject the paste from the nozzle only when the latter is approaching the limit of its rearward movement, and, in order to effect this intermittent operation of said plunger we use the devices shown in Figs. 1, 2 and 18, which are as follows:

To a vertical bearing 123 on the frame 60 is adapted a shaft 124 which has, at its upper end, a spur wheel 125 meshing with the spur wheel 113, and at its lower end a ratchet wheel 126 which, when said frame 60 is moving rearwardly, is engaged by a pawl 127 (Fig. 18) slidably mounted in a bracket 129 on the fixed frame and projected by means of a coiled spring 130 interposed between a collar 131 on the pawl and a screw cap 132 on the bracket.

The extent of projection of the pawl is governed by means of a thumb screw 133 adapted to a threaded opening in the rear end of the pawl 127 and having a head bearing upon the outer face of the screw cap 132, so that by the manipulation of this thumb screw the engaging end of the pawl may be permitted to project beyond the bracket 129 to any desired extent, and thus cause movement of the ratchet wheel 126 to the extent of one or more teeth on each rearward movement of the frame 60, thereby ejecting from the nozzle 77 any desired amount of paste on each operation, or, when it is desired to stop the feeding of paste from the nozzle, the thumb screw 133 may be manipulated so as to withdraw the forward end of the pawl 127 from engagement with the ratchet wheel 126.

The means which coöperate with the traveling belts or aprons 12 and 20 to apply the band to the cigar and wrap it around the same, comprise a tucker blade 134 with downwardly bent forward end 135, a pair of presser rollers 136, one on each side of said blade, and a pressing iron or shoe 137, which parts are supported and operated in the following manner:

The tucker blade 134 is mounted upon a lever 139 having a counter-balance weight 140 and pivotally mounted at the upper end of an arm 141 which is carried by a rock shaft 142 adapted to bearings on the base of the machine and having, at its outer end, an arm 143 which is connected by a rod 144 to another arm 145, pivotally mounted at the opposite end of the machine and carrying an anti-friction roller 146 which is acted upon by a cam 147 on the shaft 6. (See Figs. 3 and 13.)

The counter-balance weight 140 normally tends to lift the tucker blade 134, but yielding downward movement of the forward end of the same is effected by means of an arm 150, secured to a rock shaft 151 which is mounted in bearings on the arms 141 and 143, and has, at its outer end, an arm 152, connected by means of a rod 153 to another arm 154 having a projecting lug 155 which is acted upon by a cam 156 on the shaft 6. (See Figs. 3 and 14). The arm 150 carries an adjustable screw 157 which acts upon a spring 159 connected to the lever 139 which carries the tucker blade 134.

The presser rollers 136 are carried by arms 160 loosely mounted on a shaft 161 secured to and projecting from the upper end of an arm 162, which is mounted so as to be free to swing upon the rock shaft 142 and is connected by a rod 163 to an arm 164 which has a lug 165 acted upon by a cam 166 on the shaft 6, as shown in Figs. 3 and 15. The roller carrying arms 160 are normally pressed downward by means of springs 167 coiled around the shaft 161 and engaging collars 169 secured to said shaft, as shown in Fig. 5.

The shoe 137 has a curved front face and is pivotally mounted so as to swing laterally upon a lug 170 projecting from a bar 171 which connects the upper ends of a pair of arms 172 carried by a rock shaft 173, the latter being free to turn in bearings on the swinging frame 23, and one of said arms 172 being acted upon by a spring 174 tending to move the arms forwardly. Projecting from the rock shaft 173 is an arm 175 which is acted upon by a pin 176 projecting from the inner face of the spur wheel 15, as shown in Fig. 4.

The following means are employed for feeding the cigars in succession to the band wrapping devices. Suitably mounted upon side posts 177 of the fixed frame, and upon a brace 179, is an inclined trough 190, having, in its rear portion, laterally adjustable side plates 191 for roughly approximating the width of the trough to the length of the cigars which are to be banded, the forward or lower portion of the trough having, at each side, a flexible centering plate 192 free at its forward end but secured at its rear end to a shaft 193 mounted in bearings on the side of the trough and having, at its lower end, a projecting arm 194, the inner ends of these arms overlapping each other and being provided with slots 195 (see Fig. 11) for the reception of a pin 196 which projects upwardly from the arm 141, as shown in Fig. 5, whereby, as said arm moves backwardly or away from the aprons 12 and 20, the shafts 193 will be caused to turn slightly in their bearings and the forward ends of the flexible centering plates 192 will be caused to move toward each other, reverse movements taking place when the arm 141 moves forwardly or toward the aprons.

The cigars are delivered in succession to a tilting gate 197 by means of an escapement device comprising a rocking plate 199 which has, at its rear end, a hold-back blade 200 and coöperates with one or more fixed stop pins 201 projecting upwardly from a bar 202 which bridges the opening in the bottom of the trough 190 in which said plate 199 is located.

The plate 199 is carried by a rock shaft 203 mounted in bearings on the sides of the trough 190 and provided with a toothed sector 204 which meshes with a spur wheel 205 on a rock shaft 206 which carries the tilting gate 197, as shown in Fig. 4. At one end of the rock shaft 203 is an arm 207 which has, at its upper end, a projecting pin 209 adapted to a slot in a cam plate 210, the latter being secured to or forming part of a rod 211 which connects an arm 212 at the rear end of the machine with an arm 213 on a rock shaft 214 mounted in brackets 215 carried by the opposite sides of the trough 190. The arm 212 is acted upon by a cam 216 on the shaft 6, as shown in Figs. 3 and 16, and, as the connecting rod 211 travels back and forth, its cam plate is caused to impart rocking movement to the shaft 203, which, in turn, imparts rocking movement to the shaft 206. The slot in the cam plate 213 is substantially Z-shaped having terminal dwell portions 217 and an active intervening and connecting portion 219, as shown in Fig. 3.

The rock shaft 214 is provided with an arm 220 forked at its forward end so as to embrace the tubular stem 221 of a spring plunger which engages the cigar lying upon the tilting gate 197, carries said cigar downwardly and deposits it in its proper relation to the wrapping aprons 12 and 20. This plunger is, by preference, composed of two pairs of bent wire or other elastic fingers 222 which are secured to a head 223 at the lower end of the tubular stem 221, the latter being vertically guided in suitable bearings on the fixed frame, as shown in Figs. 4 and 7, each of the fingers 222 being preferably bent upwardly from its point of attachment to the head 223 and then downwardly so as to project below said head and thereby insure its elastic action upon the cigar.

The forked forward end of the arm 220 engages pins 224 projecting through slots 225 in the hollow stem 221 from a sliding rod 226 in said hollow stem, this rod being suspended by means of a coiled spring 227 from a cap or plug 229 at the upper end of the hollow stem 221, whereby the latter will have a positive upward movement but a yielding downward movement.

Swinging movement is imparted to the frame 23 by a grooved cam 260 on the shaft 6, which cam acts upon an anti-friction roller 261 on an arm 262 hung to a bearing on the base 1 and connected by a rod 263 to the frame 23, said arm being composed of threaded sections connected by a nut 264, whereby the apron 20 may be caused to approach the apron 12 as closely as may be necessary to insure the proper action of the aprons upon small cigars or may be farther separated therefrom, as may be required by larger cigars.

At the beginning of the operation of the machine the tucker blade 134, the presser rolls 136, and the ironing block or shoe 137 are retracted, as shown in Fig. 10, a cigar resting upon the tilting gate 197 which occupies the elevated position shown in Fig. 4, and the cigars in the trough 190 being held back by the blade 200 at the rear end of the rocking plate 199, which is elevated at such rear end, the elastic plunger 222 being also elevated, the apron 20 being swung forward toward the apron 12, and the stack or pile of bands being deposited upon the plunger head 36. As the paste reservoir approaches the limit of its rearward movement it drops so as to press its nozzle against the upper surface of the uppermost of the pile of bands, near the rear end of the same, at the same time pressing the hold-down plate 109 against the forward portion of said band. (See Fig. 25). The nozzle then moves rearwardly so as to spread the paste along the surface of the band, the latter being prevented from moving with it, owing to the retaining influence of the hold-down plate 109 (see Fig. 26) and while this retaining influence is still exerted the nozzle moves forward slightly by contact of the cam 75 and lug 76, so as to slightly buckle the top band and destroy its adhesion to the band below if it has any tendency to thus adhere. (See Fig. 27.) The nozzle is then raised, the rear end of the uppermost band adhering to it and being lifted from the next band in the stack, while at the same time the hold-down plate 109 is lifted from the forward end of the band. (See Fig. 28.) The paste reservoir then moves forward carrying the band ahead of it and over the elastic plate 97, over the hopper-shaped opening formed by the upper portions of the aprons 12 and 20, and over the top of the tucker blade 134, which has previously been depressed for the purpose by imparting tension to the spring 159, through the medium of the devices operated by the cam 156. At the same time the rod 211 moves so as to rock the arm 207, shaft 204 and plate 199, depressing the rear end of the latter and its hold-back plate 200 and permitting the first cigar of the series in the hopper 190 to roll down until stopped by contact with the pins 201. The same movement effects the dropping of the gate 197 and the descent of the plunger 222, which catches the cigar formerly resting upon the gate and pushes the same down into the opening formed by the upper ends of the two aprons, as shown in Fig. 10, the plunger being then retracted.

The downward pressure of the plunger upon the cigar does not injure the same, because of the elastic character of the jaws of the plunger 222, and also because the downward movement imparted to the plunger tube 221 is a yielding movement exerted from the rod 226 through the medium of the coiled spring 227. The cigar in its downward movement carries the projecting portion of the band with it and partially folds said band around the cigar, the forward end of the band being caused to project upwardly in advance of the downwardly bent end of the tucker blade 134, as shown in Fig. 10. The said blade 134 now moves forwardly and is, at the same time, caused to press the upturned end of the band yieldingly down onto the top of the cigar by reason of the pressure of the spring 159.

Having completed a partial forward movement to the position shown in Fig. 4 the tucker blade rests until the aprons 12 and 20 begin to move, whereupon it moves forward with the band, wrapping the latter around the top of the cigar, and, when it reaches the limit of its forward movement, being subjected to further downward pressure by reason of an increase of tension upon the spring 159 caused by the conformation of the cam 156, the effect of this action being to tuck the forward end of the band in between the cigar and the rear portion of the band, which still remains held between the elastic plate 97 and the pasting nozzle. The spring 159 is then released from the pressure of the devices operated by the cam 156 and the tucker blade is lifted by the counter-balance weight 140 and then retracted by the devices operated by the cam 147.

The rotation of the cigar pulls the rear end of the band forwardly and causes its pasted face to overlap the forward end of the band and to adhere thereto, this latter result being assisted by the action of the ironing or pressing shoe or block 137, which has meantime been carried forwardly by the action of the spring 174, the pin 176 having been withdrawn from beneath the arm 175 by the forward movement of the spur wheel 15. Just before the retraction of the plunger and before the advance of the tucker blade the presser rolls 136 were also moved forwardly so as to act upon the cigar on each side of the band, hold said cigar during the retraction of the plunger and cause the banded portion of the cigar to be yieldingly pressed into the hopper-shaped opening formed by the traveling belts 12 and 20.

As soon as the banding of the cigar has been completed the frame 23 is swung rearwardly so as to separate the belt 20 from the belt 12 and permit the banded cigar to drop from between them, and at the same time the movement of the aprons is arrested, and the presser rolls 136 are retracted, as is also the paste reservoir, in preparation for a repetition of the operation. On the next operation the tilting of the plate 199 not only lifts the forward cigar from its engagement with the stop pin 201 and raises the gate 197 to receive it but also engages with the next cigar of the series to prevent its downward movement in the hopper. As the cigar rolls downwardly toward the gate 197 the ends are pressed upon by the elastic plates 192, so as to properly center the cigar and insure the application of the bands to successive cigars in the same position in respect to their length.

The provision of the plate 97 with an elastic mounting effectually prevents any such gripping of the rear end of the band between said plate and the pasting nozzle as would interfere with the free withdrawal of the band during the wrapping operation, and the carrying of the pasting nozzle forward with its mouth in a higher plane than the plate or table 97 prevents any retardation of the forward movement of the band by contact with the table, the clamping of the band being effected by the dropping of the paste reservoir when it reaches the forward limit of its movement.

While we prefer in all cases to use the nozzle of the paste reservoir as the means for applying paste to the bands and carrying said bands forwardly, we may, in some cases, employ a stationary paste reservoir and a movable paste applying and band feeding device in connection therewith, and in Figs. 22, 23 and 24 we have illustrated such a modification. In these views the parts which correspond to the like parts of the machine first described are similarly numbered.

The paste reservoir 61ª is mounted in a fixed frame 60ᵇ and beneath the nozzle 77ª of the reservoir is located an endless belt or apron 230 mounted upon toothed drums 231 and 232, the drum 231 being carried by a shaft 233 which is adapted to bearings of the fixed frame of the machine and the drum 232 being carried by a shaft 234 which is mounted in bearings in a swinging frame 235 pivotally mounted upon the shaft 233 and having a rising and falling movement imparted to it by means of a cam 236 on the cam shaft 6, which cam acts upon a depending rod 237, whose upper end is adjustable in a slot 239 in the frame 235 so as to vary the extent of the rise and fall of the free end of the frame, as may be desired.

The apron 230 carries three blocks 240 and said apron has intermittent movements imparted to it of such extent that when one of the blocks 240 occupies a position above the rear end of the uppermost band of the stack, another block occupies a position above the table 97ª and the third block occupies a position beneath the pasting nozzle 77ª, as shown in Fig. 22.

The apron travels in the direction of the arrow, Fig. 22, which shows the apron in the position occupied by it during one of its periods of rest. Before its next movement, the frame 235 is dropped by the cam 236 so as to carry the pasted rear block 240 down onto the uppermost band of the stack after which said frame 235 is lifted to a limited extent in order to raise the rear end of the uppermost band from that beneath it. The apron 230 then travels forwardly so as to carry the rear block 240 and its adhering band to the forward position, and, as soon as this movement has been completed, or just before its completion, the frame 235 is raised to its highest position, as shown in Fig. 22, so as to bring the uppermost block 240 into position for receiving paste from the nozzle 77ª, the previously pasted block being moved to the rear position ready to be dropped onto the uppermost band of the stack preparatory to another feeding operation.

Intermittent movements are imparted to the shaft 233 by means of the mechanism shown in Fig. 23, this mechanism comprising a disk 241 carried by the shaft 6 and having a spur segment 242 which meshes with the toothed portions of a disk 243 loosely mounted on a pin 244 and having between its toothed portions concave blocks 245 for engagement with the plain periphery of the disk 241, whereby on each rotation of said disk a half turn will be imparted to the disk 243 and the latter will be locked between the successive half turns.

Secured to or forming part of the disk 243 is a spur wheel 246 which meshes with a spur wheel 247 on the shaft 233, said spur wheels 246 and 247 being so proportioned that a half turn of the spur wheel 246 will cause such movement of the shaft 233 as to impart the desired extent of movement to the apron 230.

In order to impart the successive movements to the plunger 110 of the paste reservoir, the shaft 124 forming part of the gearing for operating the screw stem 111 of the plunger has mounted upon it a swinging arm 250 carrying a spring pressed pawl 251 which engages the ratchet wheel 126 on the shaft 124, and this swinging arm is actuated at intervals by means of a lever 252 hung to a shaft 253 on the fixed frame and acted upon by a cam 254 on the shaft 233, the arm 250 being maintained constantly in contact with the lever 252 and the latter constantly in contact with the cam 254, by the action of a coiled spring 255 which connects a pin on the arm 250 and a lug on the fixed frame, as shown in Fig. 23.

Our machine is adapted for being supplied with the usual single and disconnected bands, the necessity for printing the bands in tapes or strips, and providing the machine with means for severing the successive bands from one another being obviated.

Other forms of movable support covered with rubber, leather or other elastic or semi-elastic material may, so far as concerns the combinations set forth in some of our claims, be considered the mechanical equivalent of the aprons, and although we have described our invention as intended for the banding of cigars and although it is specially designed for this purpose, many of the features of the invention are equally applicable to machines for applying bands or labels to other cylindrical objects as well as cigars, hence the term "cigar banding machine" as employed by us is intended to be descriptive of a type of machine and not to restrict our claims to a machine for this special purpose, nor does the term "pasting device" necessarily mean a device for supplying paste, for if the bands carry adhesive material in a dry state a moistening pad may take the place of the pasting nozzle or block which we have described.

We claim:

1. In a cigar banding machine, the combination of a band supporting device, a pasting device, and an intermittently operating carrier whereby said pasting device is caused to first contact with the rear portion of a band and then to feed it forwardly, said pasting device including a paste reservoir, and means whereby limited quantities of paste are ejected therefrom between successive pasting operations.

2. In a cigar banding machine, the combination of a receptacle for a stack of bands, a pasting device, and an intermittently operating carrier, whereby said pasting device is caused to first contact with the rear portion of a band and then to remove the same from the pile and feed it forwardly, said pasting device including a paste reservoir, and means whereby limited quantities of paste are ejected therefrom between successive pasting operations.

3. In a cigar banding machine, the combination of a receptacle for a stack of bands, a pasting device, an intermittently operating carrier, whereby said pasting device is caused to first contact with the rear portion of a band and then to remove the same from the pile and feed it forwardly and means for progressively raising the stack of bands, said pasting device including a paste reservoir, and means whereby limited quantities of paste are ejected therefrom between successive pasting operations.

4. The combination, in a cigar banding machine, of devices for wrapping a band around the cigar, with means for feeding the band to said wrapping devices, said means including a pasting device, means for causing the same to contact with a band, and means for feeding the pasting device and its adhering band forwardly, said pasting device including a paste reservoir, and means whereby limited quantities of paste are ejected therefrom between successive pasting operations.

5. The combination, in a cigar banding machine, of a receptacle for a stack of bands, a pasting device, means for causing the same to travel longitudinally over the top of the stack of bands, and means for causing contact of the paste carrying member of the device with the uppermost band of the stack, said pasting device including a paste reservoir, and means whereby limited quantities of paste are ejected therefrom between successive pasting operations.

6. The combination, in a cigar banding machine, of devices for wrapping a band around the cigar, with a device for applying paste to the band, which device also serves to feed the band to the wrapping devices, said pasting device including a paste reservoir, and means whereby limited quantities of paste are ejected therefrom between successive pasting operations.

7. The combination, in a cigar banding machine, of means for maintaining a stack of single bands, devices for wrapping a band around a cigar, and means for picking up one band at a time from the stack, pasting one end of the same, and feeding it to the wrapping devices, said pasting device including a paste reservoir, and means whereby limited quantities of paste are ejected therefrom between successive pasting operations.

8. A cigar banding maching having, as elements, a pasting device, a support for the band, means for moving one of said elements from and toward the other, in order to apply the paste to the band, and means for longitudinally moving the pasting device so as to carry the pasted band forward with it, said pasting device including a paste reservoir, and means whereby limited quantities of paste are ejected therefrom between successive pasting operations.

9. A cigar banding machine having, as elements, a support for the band, a pasting device, means for moving said pasting device from and toward the band support, and means for moving the pasting device longitudinally over the band support, whereby it will impart forward movement to the pasted band, said pasting device including a paste reservoir, and means whereby limited quantities of paste are ejected therefrom between successive pasting operations.

10. The combination, in a cigar banding machine, of a support for the band, a longitudinally movable paste reservoir provided with means for intermittently ejecting a limited quantity of paste therefrom, means whereby the reservoir is caused to move in the arc of a circle from front to rear and means for maintaining parallelism of the reservoir during such movement.

11. The combination, in a cigar banding machine, of means for maintaining a stack of single bands, means for pasting the rear end of the top band, means for bending or buckling the top band of the stack by a forward movement of the pasting device, and means for then feeding the said band forwardly, by a further forward movement of said pasting device.

12. The combination, in a cigar banding machine, of means for maintaining a stack of single bands, means for pasting the rear end of the top band, means for bending or buckling the top band of the stack by a forward movement of the pasting device, and means for then lifting said band by the pasting device and feeding it forwardly by a further forward movement of said pasting device.

13. The combination, in a cigar banding machine, of means for wrapping the band around the cigar, means for maintaining a stack of single bands, a device for applying paste to the rear end of the top band of the stack, means for moving said pasting device forwardly, and means for retaining the front end of the band during the first portion of such forward movement.

14. The combination, in a cigar banding machine, of means for wrapping the band around the cigar, means for maintaining a stack of single bands, a device for applying paste to the rear end of the top band of the stack, means for moving said pasting device first forwardly, then upwardly and then again forwardly, and means for retaining the front end of the top band during the first forward movement of the pasting device.

15. The combination, in a cigar banding machine, of means for wrapping the band around the cigar, means for maintaining a stack of single bands, a device for applying paste to the rear end of the top band of the stack, means for imparting backward and forward movement to said pasting device, means for causing a drop and rise of the same at the rear end of its travel, and means for holding down the front end of the stack of bands when the pasting device drops upon the rear end of the same.

16. The combination, in a cigar banding machine, of means for wrapping the band around the cigar, a support for the band, a pasting device, and means for first moving said pasting device into contact with the band near the rear end of the same and then moving it first toward the rear end of said band and then forwardly.

17. The combination, in a cigar banding machine, of means for wrapping the band around the cigar, a support for the band, a pasting device, and means for first moving said pasting device into contact with the band near the rear end of the same, and then moving it first toward the rear end of the band and then forwardly, and means for retaining the band during the first portion of such forward movement.

18. The combination, in a cigar banding machine, of means for wrapping the band around the cigar, a support for the band, a pasting device, means for first moving said pasting device into contact with the band near the rear end of the same, and then moving it first toward the rear end of the band and then forwardly, and means for retaining the band during both the rearward movement of the pasting device in contact therewith and during the first portion of the forward movement.

19. The combination, in a cigar banding machine, of means for wrapping the band around the cigar, a paste reservoir having a nozzle for applying paste to the bands, a carrier for said paste reservoir, and a pair of swinging levers upon which said carrier is mounted, one of said levers having a lost motion connection with the other.

20. The combination, in a cigar banding machine, of means for wrapping the band around the cigar, a paste reservoir having a nozzle for applying paste to the bands, a carrier for said paste reservoir, and a pair of swinging levers upon which said carrier is mounted, one of said levers having a lost motion connection with the other and also with the carrier for the paste reservoir.

21. The combination, in a cigar banding machine, of means for wrapping the band around the cigar, a paste reservoir having a nozzle for applying paste to the bands, a carrier for said paste reservoir, an operating device for said carrier having a support therefor means for removing said support from the carrier, and permitting the same to drop, and means for raising the carrier to render its support again operative.

22. The combination, in a cigar banding machine, of a support for the band, a device for applying paste thereto, means for carrying said pasting device and its adhering band forwardly, and means for effecting a drop of the pasting device when it reaches the limit of its forward movement.

23. The combination, in a cigar banding machine, of a support for the band, a device for applying paste to the band and carrying the same forwardly with it, means for imparting forward and backward movement to said pasting device, means for raising and lowering the same at the rear portion of its travel, and means for raising and lowering the pasting device at the forward end of its travel.

24. The combination, in a cigar banding machine, of band wrapping devices, a support for the band, a device for applying paste to the rear end of the band and feeding the latter forwardly, and means for holding the band in contact with the pasting device when the latter reaches the termination of its forward movement.

25. The combination, in a cigar banding machine, of band wrapping devices, a support for the band, a device for applying paste to the rear end of the band and feeding the latter forwardly, and yielding means for holding the band in contact with the pasting device when the latter reaches the termination of its forward movement.

26. The combination, in a cigar banding machine, of band wrapping devices, a support for the band, a device for applying paste to the rear end of the band and feeding the latter forwardly, yielding means for holding the band in contact with the pasting device when the latter reaches the termination of its forward movement, and a stop for limiting the movement of said yielding means toward the pasting device.

27. The combination, in a cigar banding machine, of means for supporting the band, means for wrapping the band around the cigar, a paste reservoir and nozzle independent of one another, a common holder for said paste reservoir and nozzle from which the reservoir is removable, and a plunger removable from the paste reservoir.

28. The combination, in a cigar banding machine, of a pair of endless aprons presenting an opening for the reception of the cigar, means for feeding a band across said opening, whereby, when a cigar is passed into the same, it will partially fold the band around it, and a reciprocating tucker for completing the fold.

29. The combination, in a cigar banding machine, of a pair of endless aprons presenting an opening for the reception of the cigar, means for feeding a band across the mouth of said opening, means for dropping a cigar into the opening so as to partially fold the band around the cigar, and a reciprocating tucker for completing the fold.

30. The combination, in a cigar banding machine, of a pair of endless aprons presenting between them an opening for the reception of a cigar, means for feeding a band across said opening, and means for forcing a cigar onto the band and into the opening, thereby partially folding the band around the cigar.

31. The combination, in a cigar banding machine, of a pair of endless aprons presenting an opening for the reception of the cigar, means for applying a band to the cigar, means for pressing the banded cigar into the opening formed by the aprons and into contact with the latter, and means for moving said aprons so as to cause rotation of the banded cigar.

32. The combination, in a cigar banding machine, of means for applying paste to the rear end of a band, means for folding the forward end of the band around the cigar, and a pair of oppositely moving aprons serving as a support for the cigar and causing the partially banded cigar to rotate and the pasted rear end of the band to overlap and adhere to the underlying forward portion.

33. The combination, in a cigar banding machine, of a pair of endless aprons presenting between them an opening for the reception of a cigar, means for feeding a band across said opening, means for forcing the cigar onto the band and into the opening, thereby partially folding the band around the cigar, and a tucker for completing the fold.

34. The combination, in a cigar banding machine, of means for wrapping a band around the cigar, said means, having, as elements, a pair of endless aprons serving for the support and rotation of the cigar, with means for separating said aprons to permit the cigar to drop from between them.

35. The combination, in a cigar banding machine, of a pair of endless aprons presenting an opening for the reception and support of the cigar, means for feeding a band across the mouth of said opening, whereby when a cigar is dropped onto the band and into the opening, it will partially fold the band around the cigar, and a reciprocating tucker blade having a downwardly bent forward end for completing the folding of the forward end of the band around the cigar.

36. The combination, in a cigar banding machine, of a pair of endless aprons presenting an opening for the reception and support of the cigar, means for feeding a band across the mouth of said opening, whereby, when a cigar is dropped onto the band and into the opening it will partially fold the band around the cigar, a reciprocating tucker blade having a downwardly bent forward end for completing the folding of the forward end of the band around the cigar, and means for imparting a yielding downward pressure to said forward end of the tucker.

37. The combination, in a cigar banding machine, of a pair of endless aprons presenting an opening for the reception and support of the cigar, means for feeding a band across the mouth of said opening, whereby, when a cigar is dropped onto the band and into the opening it will partially fold the band around the cigar, a reciprocating tucker blade having a downwardly bent forward end for completing the folding of the forward end of the band around the cigar, means for imparting a yielding downward pressure to said forward end of the tucker, and means for varying said pressure.

38. The combination, in a cigar banding machine, of a pair of endless aprons presenting an opening for the reception and support of the cigar, means for folding a band around the cigar, and means for imparting yielding pressure to the cigar to maintain its banded portion in contact with the apron.

39. The combination, in a cigar banding machine, of a pair of endless aprons presenting an opening for the reception and support of the cigar, means for folding a band around the cigar, and means for imparting yielding pressure to the cigar to maintain its banded portion in contact with the aprons, said means including rollers for pressing upon the cigar on each side of the band.

40. The combination, in a cigar banding machine, of means for wrapping the band around the cigar, means for rotating the cigar with the band upon it, a non-rotating presser for pressing the band against the cigar during such rotation, and means for moving said presser into and out of contact with the band.

41. The combination, in a cigar banding machine, of means for wrapping the band around the cigar, means for rotating the banded cigar, said means having, as an element, an endless apron carried by a swinging frame, and a non-rotating presser for pressing the band upon the cigar as the latter is rotated, said presser being mounted upon the swinging frame but susceptible of movement independently thereof.

42. The combination, in a cigar banding machine, of means for wrapping the band around the cigar, means for rotating the cigar with the band upon it, a non-rotating presser for pressing the band against the cigar during such rotation, and means for imparting yielding movement to said presser.

43. The combination, in a cigar banding machine, of means for wrapping the band around the cigar, means for rotating the cigar with the band upon it, a non-rotating presser for pressing the band upon the cigar during such rotation, means for moving said presser into and out of operative position, and means for imparting yielding movement to the presser when it is acting upon the band.

44. The combination, in a cigar banding machine, of means for wrapping the band around the cigar, means for rotating the cigar with the band upon it, a non-rotating presser for pressing the band against the cigar during such rotation, and means whereby said rotating devices also control the operation of the presser.

45. The combination, in a cigar banding machine, of means for wrapping the band around the cigar, means for rotating the cigar with the band upon it, a non-rotating presser for pressing the band against the cigar during such rotation, and a carrier for said presser upon which the latter is pivoted so as to swing laterally.

46. In a cigar banding machine, a feeding device comprising a hopper down which the cigars can roll, projecting pins in the bottom of the hopper, and a tilting plate with hold back blade coöperating with said pins to form an escapement device for delivering the cigars, one at a time, to the discharge end of said hopper.

47. In a cigar banding machine, a feeding device comprising a hopper, means for delivering the cigars one at a time to the delivery end of said hopper, and a plunger for discharging the cigars therefrom, said plunger consisting of a stem with elastic jaws, each consisting of a wire secured to said stem and bent first backwardly and then forwardly beyond the end of the same.

48. In a cigar banding machine, a feeding device comprising a hopper, means for delivering the cigars one at a time to the delivery end of said hopper, a plunger for discharging the cigars therefrom, and means for imparting yielding forward movement to said plunger.

49. In a cigar banding machine, a feeding device comprising a hopper, means for delivering the cigars one at a time to the delivery end of said hopper, a plunger for discharging the cigars therefrom, said plunger consisting of a stem with elastic jaws, and means for imparting yielding forward movement to said stem.

50. In a cigar banding machine, a feeding device comprising a hopper, means for delivering the cigars one at a time to the delivery end of said hopper, a plunger for discharging the cigars therefrom, and means for imparting yielding forward movement to said plunger and positive backward movement thereto.

51. In a cigar banding machine, a feeding device comprising a hopper, means for delivering the cigars one at a time to the delivery end of said hopper, a plunger for discharging the cigars therefrom, said plunger consisting of a stem with elastic jaws, and means for imparting yielding forward movement to said stem and positive backward movement thereto.

52. In a cigar banding machine, a feeding device comprising a hopper having a positively actuated and downwardly tilting gate at its delivery end, means for feeding the cigars one at a time to said gate, and a plunger for engaging the cigar upon the gate and discharging it from the hopper.

53. In a cigar banding machine, a feeding device comprising a hopper having a tilting gate at its delivery end, means for feeding the cigars one at a time to said gate, a plunger for engaging the cigar upon the gate and discharging it from the hopper, and means for operating said gate and plunger in unison.

54. In a cigar banding machine, a feeding device comprising a hopper having a tilting delivery gate, an escapement device for feeding the cigars one at a time to said delivery gate, a plunger for engaging the cigar on the delivery gate and discharging it from the hopper, and connected means for operating said plunger, delivery gate and escapement device.

55. In a cigar banding machine, the combination of endless aprons for receiving the cigar, a feeding device having a hopper with means for delivering the cigars one at a time to the delivery end of said hopper, a plunger for discharging the cigars therefrom, and pressure devices for retaining the cigar during the retraction of the plunger.

56. In a cigar banding machine, the combination of endless aprons for receiving the cigar, a feeding device having a hopper with means for delivering the cigars one at a time to the delivery end of said hopper, a plunger for discharging the cigars therefrom, and pressure devices for retaining the cigar during the retraction of the plunger, said pressure devices having rollers for bearing upon the cigar.

57. In a cigar banding machine, the combination of wrapping devices including, as an element, a reciprocating tucker blade, a feeding hopper having elastic and vibrating side plates for bearing upon the ends of the cigars and centering the cigar in the hopper, means for reciprocating the tucker blade, and means operated thereby for effecting vibration of the centering plates.

58. In a cigar banding machine, the combination of the band support, a pasting device for engaging said bands in succession and feeding them forward to the wrapping devices, means for operating said pasting device, comprising a vertically movable paste receptacle, a swinging lever carrying the same, a reciprocable rod mounted on said lever, and means for operating said rod so as to lift the paste receptacle in respect to the lever.

59. In a cigar banding machine, the combination of a band support, a pasting device for engaging said bands in succession and feeding them forward to the wrapping devices, means for operating said pasting device comprising a vertically movable paste receptacle, a swinging lever carrying the same, a reciprocable rod mounted on said lever, and means for operating said rod so as to lift the paste receptacle in respect to the lever, said means comprising a rocking lever and a cam for operating the same.

60. In a cigar banding machine the combination of means for wrapping the band around the cigar, a support for a stack of bands, a device for applying paste to the rear portion of a band, said pasting device having rising and falling movement, a hold-down plate for engaging the forward portion of the band while paste is being applied to its rear portion, and a pivoted lever carrying said plate and having slotted connection with its pivot.

61. In a cigar banding machine, the combination of means for wrapping the band around the cigar, a support for a stack of bands, a pasting device having up and down and forward and backward movement, a hold down plate for the bands, and a pivoted lever carrying said plate and having a slotted connection with the pasting device.

62. In a cigar banding machine, the combination of means for wrapping the band around the cigar, a support for a stack of bands, a pasting device having up and down and forward and backward movement, a hold down plate for the bands, and a pivoted lever carrying said plate and having a slotted connection with both the pivot and the pasting device.

In testimony whereof, we have signed our names to this specification, in the presence of two subscribing witnesses.

JAS. J. FEARON.
THOMAS E. FEARON.

Witnesses:
HAMILTON D. TURNER,
ELSIE FULLERTON.